United States Patent [19]

Kircher et al.

[11] Patent Number: 4,702,531
[45] Date of Patent: Oct. 27, 1987

[54] METHOD FOR THE CONTROL OF A SLIP-CONTROLLED BRAKE SYSTEM AND DEVICE FOR IMPLEMENTING THE METHOD

[75] Inventors: Dieter Kircher, Frankfurt am Main; Hubertus von Gruenber, Kronberg; Klaus D. Blum, Kelkheim, all of Fed. Rep. of Germany

[73] Assignee: ITT Industries, Inc., New York, N.Y.

[21] Appl. No.: 9,012

[22] Filed: Jan. 28, 1987

Related U.S. Application Data

[63] Continuation of Ser. No. 609,573, May 11, 1984, abandoned.

[30] Foreign Application Priority Data

May 14, 1983 [DE] Fed. Rep. of Germany ....... 3317629

[51] Int. Cl.⁴ .......................... B60T 8/44; B60T 8/36; F15B 7/00
[52] U.S. Cl. ..................... 303/114; 60/591; 303/119
[58] Field of Search ................. 303/6 C, 95, 97, 110, 303/111, 114, 116, 119, 113; 60/545, 547.1, 591; 188/181 A, 181 C

[56] References Cited

U.S. PATENT DOCUMENTS

| | | |
|---|---|---|
| 3,578,820 | 5/1971 | Riordan ............................... 303/114 |
| 3,768,874 | 10/1973 | Riordan ............................. 303/114 X |
| 3,856,362 | 12/1974 | Howard ............................ 60/545 X |
| 4,057,301 | 11/1977 | Foster ................................. 303/114 |
| 4,170,066 | 10/1979 | Blomberg et al. ................... 303/114 |
| 4,244,186 | 1/1981 | Mehren ........................... 60/547.1 X |
| 4,414,630 | 11/1983 | Harris et al. ....................... 303/97 X |
| 4,455,827 | 6/1984 | Margetts ............................ 60/547.1 |
| 4,492,413 | 1/1985 | Belart et al. ...................... 303/114 X |

FOREIGN PATENT DOCUMENTS

| | | |
|---|---|---|
| 1941098 | 2/1971 | Fed. Rep. of Germany . |
| 2137904 | 2/1973 | Fed. Rep. of Germany . |
| 2362315 | 7/1974 | Fed. Rep. of Germany . |
| 2346886 | 3/1975 | Fed. Rep. of Germany . |
| 2123647 | 12/1980 | Fed. Rep. of Germany . |
| 3010639 | 9/1981 | Fed. Rep. of Germany . |
| 3040562 | 5/1982 | Fed. Rep. of Germany . |
| 3119144 | 12/1982 | Fed. Rep. of Germany . |
| 1101582 | 1/1968 | United Kingdom . |
| 1372896 | 11/1974 | United Kingdom . |
| 1378368 | 12/1974 | United Kingdom . |
| 1473729 | 5/1977 | United Kingdom . |
| 1511254 | 5/1978 | United Kingdom . |
| 2036222 | 6/1980 | United Kingdom ................ 303/119 |
| 1585563 | 3/1981 | United Kingdom . |
| 1585562 | 3/1981 | United Kingdom . |
| 2086510 | 5/1982 | United Kingdom . |

OTHER PUBLICATIONS

Bosch, Techniscme Berichte, vol. 7, edition 2, p. 87 (1980).

Primary Examiner—Andres Kashnikow
Assistant Examiner—Robert J. Oberleitner
Attorney, Agent, or Firm—James B. Raden; Robert P. Seitter

[57] ABSTRACT

For the control of a brake-slip controlled brake system the brake pedal force assisted by auxiliary force is transmitted onto a master cylinder (10, 10', 33) and from said onto the wheel brake cylinders via several pressure fluid paths that are adapted to be closed independently of one another. The wheel rotational behavior and the vehicle velocity will be measured with sensors (S1 through S4), the signals will be logically combined, and therefrom control signals will be generated for electromagnetically actuatable directional control valves (15, 16, 17, 19, 35, 36, 37, 42, 43, 52). During control action, the pedal force (F) that is directed to the master cylinder and assisted by auxiliary force will be compensated temporarily by an opposed force, as a result whereof the pressure rise in the master cylinder will be retarded or pressure will even be decreased. During the phase of reduced pressure in the master cylinder, the switching position of the directional control valve (15, 16, 17, 35, 36, 42, 43) which are inserted in the pressure fluid lines (24, 24', 25, 25') leading to the wheel brake cylinders will arrange for the pressure in the wheel brake cylinders to be either maintained constant due to line closure, or to be reduced to the level desired by causing pressure fluid to discharge to the master cylinder (10, 10', 33) through the directional control valves switched to open passage.

1 Claim, 3 Drawing Figures

METHOD FOR THE CONTROL OF A SLIP-CONTROLLED BRAKE SYSTEM AND DEVICE FOR IMPLEMENTING THE METHOD

BACKGROUND OF THE INVENTION

The present invention relates to a method for the control of a brake-slip controlled brake system for automotive vehicles, in particular for road vehicles, wherein the pedal force assisted by auxiliary force is transmitted onto a master cylinder and is therefrom transmitted onto the individual wheel brake cylinders via several pressure fluid paths adapted to be closed independently of one another, and wherein the wheel rotational behavior and the vehicle velocity or a value corresponding to the vehicle velocity will be measured, the signals obtained thereby will be logically combined and processed as well as evacuated to generate control signals by which in the event of a control action, i.e. upon the occurence of an imminent locked condition at a wheel, the braking pressure at the wheels will be decreased, kept constant or increased individually or in groups in dependence upon the wheel rotational behaviour. Brake systems for implementing this method are likewise covered by the present invention.

As used herein, the word "dose" means a force which is applied during the period of a pulse which recurs cyclically at a pulse repetition frequency governed by the instantaneous wheel rotational behavior.

There are known already brake-slip controlled brake systems, wherein the auxiliary energy for boosting the brake pedal force acting on the master cylinder is developed by virtue of a hydraulic unit which is substantially composed of an electromotively driven pump and a hydraulic accumulator. In this arrangement, there is assigned to each individually controllable wheel one electromagnetically actuatable inlet valve that is inserted in the path connecting the master cylinder to the wheel cylinder. Moreover, the wheel brake cylinder may be connected to the supply reservoir via an outlet valve. If both valves are 'closed', the braking pressure at the connected wheel remains constant. If the outlet valve is opened for a short time, in dependence upon the magnitude of the pressure level desired, discharge of pressure medium to the supply reservoir and thus pressure decrease will take place. Therefore, a re-increase of the braking pressure by renewed opening of the inlet valve would have as a result a reduction of the hydraulic volume in the working chamber of the master cylinder and finally an exhaustion, for what reason pressure medium has to be supplied to the working chamber via a separate path with the aid of the auxiliary energy source (German printed and published patent applications Nos. DE-OS 30 40 561, DE-OS 30 40 562).

In other known brake systems comprising hydraulic energy supply, the master cylinder will be isolated temporarily from the hydraulic brake circuit of the controlled wheel by means of switching valves during control actions, and the volume discharged into the supply reservoir during pressure decrease will be topped up directly out of the auxiliary energy source (German Pat. No. 21 37 904).

It is also known to pump the brake fluid removed from the wheel brake cylinder during pressure decrease back into the master cylinder by means of a return delivery pump (Bosch, Technische Berichte, volume 7 (1980), edition 2, page 87).

The supply of fluid into the working chambers of the master cylinder or - by circumventing the master cylinder—directly into the wheel brake cylinder involves in all cases relatively great manufacturing efforts.

Other known brake slip control systems are equipped both with a vacuum power brake booster and with a hydraulic unit as auxiliary energy source for the event of control action (German printed and published patent application No. 30 10 639). This bears the advantage that, upon failure of the hydraulic unit, the brake force boosting—via the vacuum booster—is maintained. The expenditure entailed in total is, however, considerable.

The quantity of fluid taken from the wheel brake cylinder for the purpose of braking pressure decrease may principally be received also in a plunger chamber, that means a cylinder chamber closed by a piston (German printed and published patent application No. 31 19 144). In this case, for re-build-up of the pressure, the plunger chamber will be narrowed by resetting of the piston by the action of an auxiliary force, as a result whereof the fluid propagates back to the wheel brake cylinder. Likewise such brake systems involve much effort.

It is therefore an object of the present invention to develop a reliable brake slip control apparatus which meets all requirements and which distinguishes over known brake systems of this type above all by a straightforward design and by requiring little manufacturing efforts.

SUMMARY OF THE INVENTION

This object can be achieved by a method of the type initially referred to which, during control action, arranges for the pedal force that is directed to the master cylinder and assisted by auxiliary force to be temporarily compensated partially or to its full extent by an opposed auxiliary force, whereby the pressure rise is slowed down or pressure is decreased in the master cylinder, and which, during the phase of reduced pressure in the master cylinder, arranges for the braking pressure at the individual wheels or wheel groups to be maintained constant in dependence upon the measured instantaneous wheel rotational behavior by closure of the respective pressure fluid line to the wheel brake cylinder, or to be reduced via an opened pressure fluid path to the master cylinder.

A brake slip conrol apparatus working up to the inventive method permits to be manufactured with comparatively very little effort. According to a particularly expedient embodiment of this invention, the components of a like brake system confine themselves to a servo unit combined with a master cylinder which differs from any conventional vacuum power brake booster only in minor features, i.e. essentially only in the interchangeability of the two working chambers on either side of the working piston. In addition, there are required each one two-way/two-position directional control valve for each individually controllable hydraulic circuit, one four-way/two-position directional control valve for interchanging the atmosphere and vacuum ports, sensors for the determination of the wheel rotational behaviour as well as electronics for the evaluation of the signals and for the generation of the valve control signals. In comparison with conventional brake slip control apparatuses, the expenditure entailed is hence very small, although the control fulfills all requirements and—according to the allotment of the hydraulic circuits and the signal paths—permits to control all wheels or several wheel groups, e.g. the two vehicle diagonals, independently of one another.

That is to say, the invention is based on the reflection that one non-return valve or two-way/two-position directional control valves per hydraulic control circuit suffice for a complete brake slip control apparatus, if one compensates in a control action for a short time the central pedal force that is assisted by auxiliary force and acts on the master cylinder for decreasing the braking pressure in a wheel cylinder, thereby decreases the pressure in the master cylinder, and if one isolates during this phase or interval of reduced pressure in the master cylinder all hydraulic brake circuits from the master cylinder—with the exception of that circuit of too high pressure in which locking tendency was sensed. The pressure in the circuit, which continues to be switched to open passage, will therefore follow the reduced pressure, whilst in all other circuits the braking pressure remains constant in this phase. Subsequently, one hydraulic brake circuit or several other hydraulic brake circuits will be connected to the master cylinder again, if necessary, and the pressure in the master cylinder will be adjusted, by suitably dosing the auxiliary force opposing the pedal force, to assume the value calculated by the electronics and determined momentarily for this brake circuit. Moreover, the pressure variation in the wheel brake cylinder can be varied in dependence upon the instantaneous master cylinder pressure by connecting the circuits to the master cylinder for a limited period of time, for instance by pulsewise actuation of the two-way/two position directional control valves etc.

It is furthermore of significance according to the present invention that the opposed force, by which the pedal force assisted by auxiliary force is temporarily compensated, is so to speak generated by reversion of the two working chambers left and right of the working piston in the booster. In conformity with conventional vacuum boosters, this principle permits in a very simple way to finely and precisely set the gradient and the magnitude of the opposed force, namely by interchange of the vacuum and the atmosphere ports which extend in this case via a four-way/two-position directional control valve for example, or by variation of the change-over times.

BRIEF DESCRIPTION OF THE DRAWINGS

Further features, advantages and applications of the present invention can be gathered from the following description of further details with reference to the accompanying drawings.

In a schematically simplified illustration

DETAILED DESCRIPTION

Figure 1:
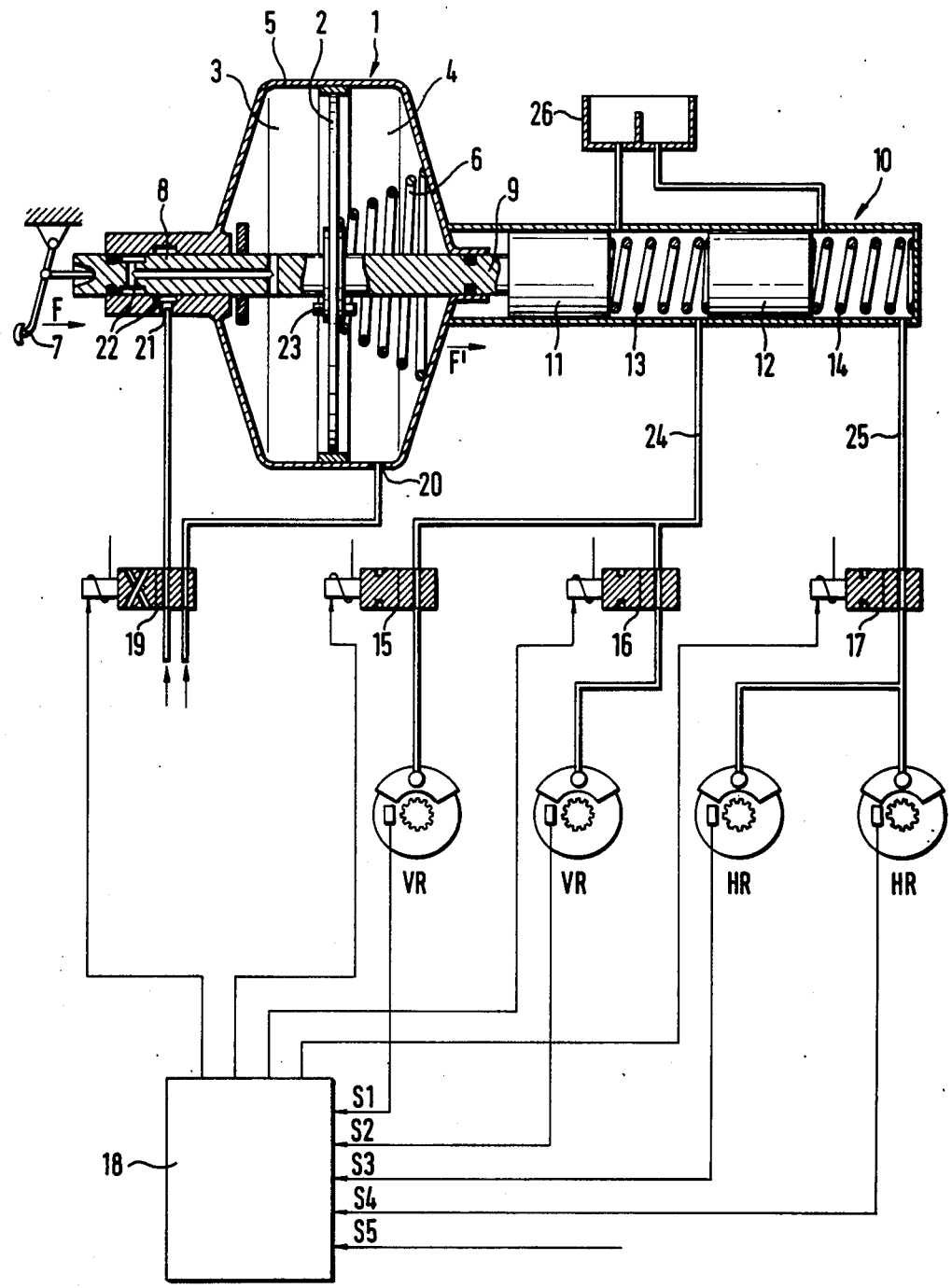
FIG. 1 shows a brake system with a vacuum servo unit according to one embodiment of the present invention.

In the embodiment of FIG. 1, the inventive brake system comprises a servo unit 1 which is designed pursuant to the principle of any conventional vacuum power brake booster and which disposes of a working piston 2 and of the two working chambers 3 and 4 which are confined by the housing or vacuum cylinder 5, on the one hand, and by the working piston 2, on the other hand. Said piston 2 is returned to the release position of the brake by the piston-return spring 6. The brake pedal force F is transmitted from the pedal 7 via a piston rod 8 onto the piston 2. The pedal force F' boosted by auxiliary force is transmitted from the piston 2, with the aid of a push rod 9, directly onto the master cylinder, here onto the pistons 11 and 12 of a tandem master cylinder 10. As usual, the two pistons will be returned to their initial position after release of the brake by springs 13 and 14.

Connected to the tandem master cylinder 10 are the front wheels VR via each one two-way/two-position directional control 15, 16 and the rear wheels HR via the two-way/two-position directional control valve 17. By virtue of the valves 15, 16, the braking pressure at the front wheels is controllable individually, while the braking pressure at the rear wheels is controllable only jointly be means of the valve 17.

In the embodiment shown in FIG. 1, the wheel rotational behavior of all wheels is queried via sensors, e.g. inductive transducers. Via signal lines 51 through 54, corresponding signals are supplied to a central electronics 18. If this information were not gained from the sensor signals 51 through 54, data about the vehicle velocity or deceleration could be delivered via the sensor input 55 which is but indicated.

In the electronics 18, the sensor signals are logically combined, processed, and therefrom control signals will be generated according to predetermined criteria for the two-way/two-position directional control valves 15, 16, 17 and for a four-way/two-position directional control valve 19.

All valves are shown in FIG. 1 in their de-energized switching condition in which they are prior to the commencement of brake slip control, that is to say likewise during a braking action without slip control. Hence it follows that even upon failure or upon disconnection of the electronics or of the power supply, braking operation boosted by auxiliary force will be safeguarded further, through without brake slip control.

Via the vacuum port 20, the atmosphere port 21 and the pedal-actuated atmosphere control valve 22, which latter doses the air intake into the working chamber 3 in dependence upon the pedal force F, the servo unit 1 is first operated like any conventional vacuum brake power booster. Prior to the brake application, vacuum prevails both in the left and in the right working chamber 3, 4 of the servo unit 1, the said vacuum propagating via the directional control valve 19 and the port 20 into the right working chamber 4 and via the valve 23 only indicated into the left working chamber 3. Upon brake application, first the valve 23 will be closed and then outside air is dosedly introduced via the second open passage through the valve 19, the port 21 and the valve 22 into the working chamber 3. The pressure difference between the chambers 3 and 4 results in an auxiliary force which boosts the pedal force F and together with said is transmitted via the push rod 9 in the direction of the arrow F' onto the pistons in the master cylinder 10 and finally via the hydraulic brake circuits 24,25 onto the symbolically drawn wheel brake cylinders of the front and the rear wheels.

A supply reservoir 26 furnishing the master cylinder 10 with pressure fluid is likewise indicated in FIG. 1.

If an imminent locked condition is sensed at a wheel, for instance at the front wheel VR illustrated on the left hand, and if a corresponding signal is supplied via the signal line S1 to the electronics, brake slip control will commence. For this purpose, the connection of the ports 21 and 20 will be exchanged for a short time by energization of the valve 19, as a result whereof the pressure conditions in the working chamber 3 and 4 will be changed, and thereby the force F' transmitted from the push rod 9 onto the master cylinder 10 will be compensated partially or even to its full extent. The pressure in the working chambers 13 and 14 drops. Since however at the same time, i.e. for the duration of the pressure-decrease phases, the valves 16 and 17 which lead to the wheels not (yet) showing any tendency to lock have been changed over, solely the pressure in the wheel brake cylinder of the front wheel connected to the valve 15 will follow the decrease of the master cylinder pressure.

Upon termination of the pressure decrease at the front wheel VR illustrated on the left hand, the assigned valve 15 will be energized, thus the pressure at this wheel will be kept constant at the low level, and the braking pressure in the master cylinder 10 will be re-increased by switching back of the valve 19 into its initial position. By unlocking or switching back any one of the valves 16 or 17 or both of them, the braking pressure rise can be continued in any one or in both circuits.

In the same manner, i.e. by closure of the hydraulic circuits not concerned and by temporary changing-over of the valve 19 in the vacuum and atmosphere lines, the braking pressure may be decreased successively or in parallel at the second front wheel and at the rear axle to assume the value calculated by the electronics 18, it may be kept constant or increased by corresponding valve control.

It is assumed to be an expedient in some cases to use instead of the four-way/two-position directional control valve 19 a four-way/three-position directional control valve (not shown here), in the third switching position of which both connecting paths, that means that to the atmosphere and that to the vacuum, are interrupted.

Figure 2:
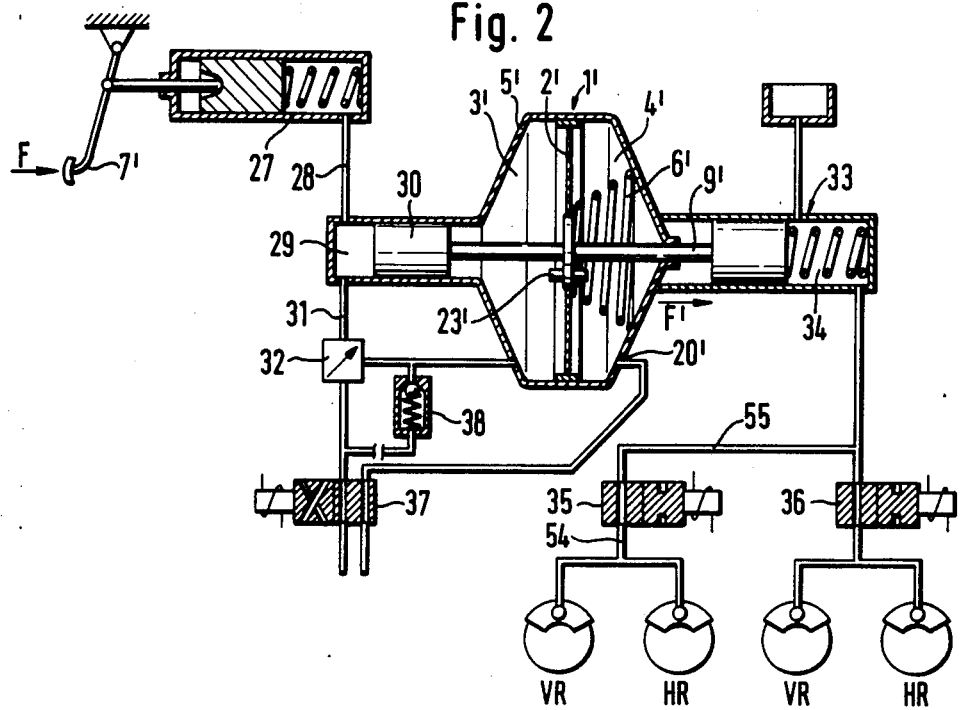
FIG. 2 shows a system according to another embodiment of this invention which is provided among others for being mounted retrospectively and which is equipped likewise with a vacuum servo unit.

According to the design variant of an inventive brake system illustrated in FIG. 2, there is merely one hydraulic connection 28 between a pedal master cylinder 27 and the servo unit 1'. This design is therefore particularly appropriate for retrofitting or for an accommodation at a greater distance away from the brake pedal 7'. As regards the housing 5', the working piston 2', the piston-return spring 6', the push rod 9' and the working chamber 3', 4' as well as the valve 23' which allows the vacuum to propagate from the chamber 4' into the chamber 3' in the release position, there is no principal difference compared to the corresponding parts of the embodiment of FIG. 1.

The pressure introduced via the line 28 into the inlet chamber 29 acts on the piston 30, on the one hand, and via the line 31 on a control valve 32, on the other hand, which latter valve is in its mode of function comparable with the valve 22 in FIG. 1 and which—in the event of braking operation 5' without slip control—controls the intake of outside air into the working chamber 3' in dependence upon the pedal force F.

Instead of a tandem master cylinder, in the embodiment of FIG. 2 a single-type master cylinder 33 is utilized whose working chamber 34 is communicating hydraulically with a vehicle diagonal via each one two-way/two-position directional control valve 35,36.

There are no basic differences regarding the brake slip control in comparison to the brake system of FIG. 1. For the purpose of decreasing the braking pressure in a vehicle diagonal, in what respect the wheel in lead can be chosen pursuant to the principle 'select high' or 'select low' in dependence upon the dimensioning of the brake system in each diagonal or each hydraulic branch 54, 55, respectively, there will be generated for a short time an auxiliary force opposed to the pedal force F by energization of a four-way/two-position directional control valve 37 in the atmosphere and vacuum lines, whereby the pressure in the master-cylinder working chamber 34 will be reduced and the second hydraulic branch, in which no brake slip control is desired to take place in this phase, will be isolated momentarily by energization of the two-way/two-position directional control valve 35 and 36, respectively, leading to this circuit.

To circumvent the control valve 32 in the pressure-decrease phase, it is of advantage in some embodiments to arrange for a check valve 38 which accelerates the build-up of vacuum in the working chamber 3' and which enables a design simplification of the valve 32.

Since there is no principal difference compared to FIG. 1, FIG. 2 does not show the sensors required for the determination of the wheel rotational behavior, nor the signal and the control lines or the electronics.

Figure 3:
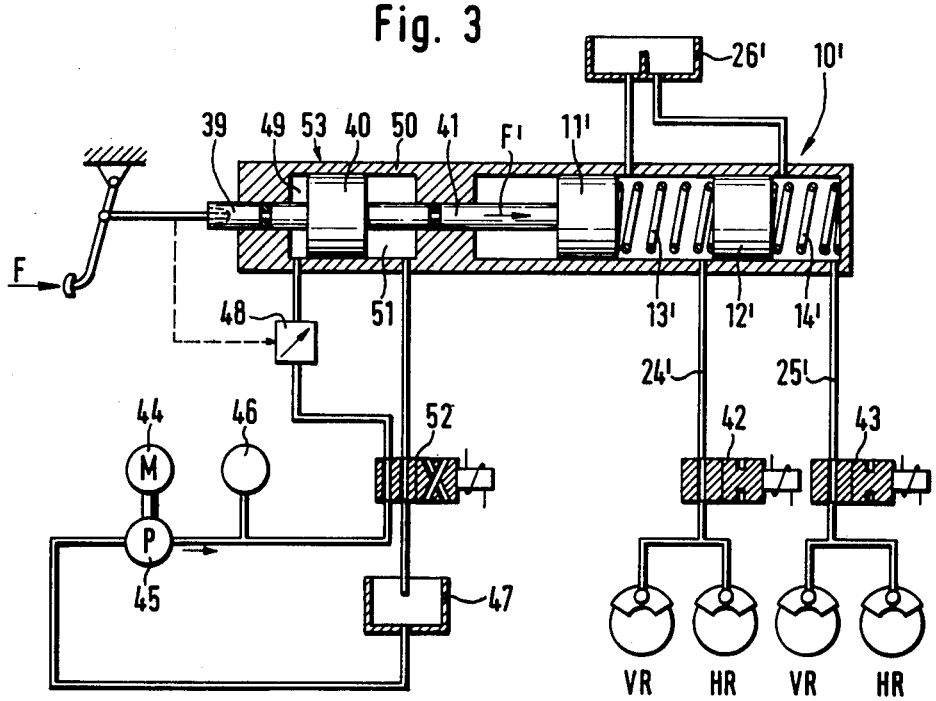
FIG. 3 shows a brake system according to this invention with hydraulic auxiliary energy supply system.

Instead of a vacuum servo unit, the present invention allows to employ likewise a hydraulic auxiliary energy supply system for the boosting of the pedal force F' directed to the master cylinder and for the generation of a compensating counterforce, as is illustrated in FIG. 3. To this end, the pedal force F is inventively transmitted via the piston rod 39 onto a booster piston 40 and from said via a push rod 41 in the direction of the arrow F' onto a master cylinder, the latter being again a tandem master cylinder 10' with the two pistons 11', 12' and the return springs 13', 14' in this arrangement. Connected to the outlets of the master cylinder 10' are the two hydraulic brake circuits 24', 25', which are each leading to the wheel brake cylinders of a vehicle diagonal in the embodiment shown herein, the said brake circuits being closed or isolated, respectively, independently of one another by two-way/two-position directional control valves 42,43, with a view to enabling in the control phase to vary the pressure in one circuit and to keep the braking pressure in the other circuit constant at the same time.

The hydraulic auxiliary energy supply system consists essentially of a pump 45 driven by means of an electric motor 44, and of a pressure accumulator 46. The suction side of the pump is connected with a supply and pressure-compensating reservoir 47, while the pressure side communicates via a brake valve 48, that is governed mechanically by the pedal force F, with the pedal-side chamber 49 within a cylinder 50 in which the booster piston 40 is axially slidably supported. The working chamber 51 of the booster remote from the pedal is at first still in communication with the compensating reservoir 47. The pressure introduced via the brake valve 48 into the chamber 49 will hence result in assisting and thus in boosting the brake pedal force F.

As soon as an imminent locked condition of any wheel or of the leading wheel of a diagonal is sensed—the electric and electronic devices are not illustrated in FIG. 3 for the sake of clarity—the four-way/two-position directional control valve 52 will be energized, and consequently the pressure conditions in the chambers 49 and 51 will be changed, the result being a partial or complete compensation of the pedal force F' that is directed to the master cylinder 10' and that is assisted by auxiliary force.

It may be expedient in some embodiments, for instance in order to permit control of the required weak braking pressure with slight pressure variations or low pressure amplitudes in the event of aquaplaning or icy roads, to substitute the four-way/two-position directional control valve 52 by a four-way/three-position directional control valve which inheres a switch condition in which there is closure of the supply and pressure-compensating line, or by two separate two-way/three-position directional control valves which allow both the closure and the opening of the passage from the chambers 49 and 51 to the pressure source or to the compensating reservoir independently of one another.

It is common to all embodiments described that the pressure variation in the working chambers 3, 4, 3', 4', 49, 51 in which the auxiliary force takes effect, in the master cylinder and in the individual wheel brake cylinders can be modified and controlled in manifold ways by pulse-wise actuation of the solenoid valve, in what respect variation of the pulse-pause ratio and/or of the frequency is possible, by insertion of throttles acting in one or in two directions etc. The advantages attained owing to the arrangements proposed by the invention and the considerable simplifications in comparison with known brake slip control apparatuses will be maintained nevertheless.

What is claimed is:

1. A method for the control of a brake-slip-controlled brake system for automotive vehicles having wheels, particularly for road vehicles, wherein a pedal force is transmitted to a master cylinder assisted by an auxiliary force, said auxiliary force being created by an differential of pressures acting on opposite sides of a piston-like means, and then said pedal and auxiliary forces are combined and transmitted to a plurality of wheel brake cylinders via several pressure-fluid paths which are each adapted to be closed independently of one another, and wherein each wheel's rotational behavior and vehicle velocity are measured by independent sensors, signals obtained thereby are combined, processed and evaluated at a single master station to generate logical control signals in response to a control action corresponding to a detection of a start of a locked condition at any of the independent wheel sensors, the braking pressure at said individual wheels varying in response to the wheel rotational behavior, said method comprising the steps of:

temporarily compensating the pedal force that is being assisted by the auxiliary force and applied to a said master cylinder (10 10', 33) by modifying said auxiliary force by reversing the differential in pressures to the opposite sides of said piston-like means to produce an opposed force, reducing pressure in the master cylinder (10, 10' 33) and maintaining constant braking pressure at selected wheels in response to said sensor signals during the pressure reduction in the master cylinder, depending upon individual measured wheel rotational behavior, regulating a fluid flow through one of said several pressure fluid paths leading to an individual wheel brake cylinder and to the master cylinder also in response to said sensor signals for reducing brake fluid pressure in the master cylinder;

intermittently closing the pressure-fluid paths (24, 24', 25, 25') from said master cylinder to each of the wheel brake cylinders of said selected wheels independent of the opposed force applied to compensate the pedal force in a pulse frequency responsive to the sensed instantaneous rotational characteristics of the wheel.

* * * * *